United States Patent [19]
Vogel et al.

[11] Patent Number: 5,564,868
[45] Date of Patent: Oct. 15, 1996

[54] PNEUMATIC TRANSMISSION SYSTEM

[75] Inventors: Victor J. Vogel, Oak Ridge; Robert M. O'Connor, Jersey City; Robert D. Smith, Jr., Wantage, all of N.J.

[73] Assignee: Mosler, Inc., Hamilton, Ohio

[21] Appl. No.: 184,209

[22] Filed: Jan. 21, 1994

Related U.S. Application Data

[63] Continuation of Ser. No. 914,885, Jul. 16, 1992, Pat. No. 5,304,017.

[51] Int. Cl.⁶ ................................................ B65G 51/34
[52] U.S. Cl. ........................ 406/112; 406/147; 406/177
[58] Field of Search ........................ 406/112, 111, 406/147, 151, 176, 177, 110, 13, 18, 22, 28, 29

[56] References Cited

U.S. PATENT DOCUMENTS

| D. 272,076 | 1/1984 | Greene. |
| D. 278,638 | 4/1985 | Kraemer. |
| 431,701 | 7/1890 | Leake. |
| 690,920 | 1/1902 | Steinback. |
| 730,715 | 6/1903 | Blood. |
| 873,740 | 12/1907 | Fordyce. |
| 923,458 | 6/1909 | Stoddard. |
| 1,045,205 | 11/1912 | Skirrow. |
| 1,087,631 | 2/1914 | Batcheller. |
| 1,092,982 | 4/1914 | D'Humy. |
| 1,517,671 | 12/1924 | Dinspel. |
| 1,592,911 | 5/1926 | Stoetzel. |
| 3,104,078 | 9/1963 | Buchwald. |
| 3,711,038 | 1/1973 | Van Otteren. |
| 3,778,006 | 12/1973 | Martin. |
| 3,985,316 | 10/1976 | Weissmuller. |
| 4,003,530 | 1/1977 | Davis. |
| 4,135,684 | 1/1979 | Willey. |
| 4,178,662 | 12/1979 | Borodin. |
| 4,180,354 | 12/1979 | Greene. |
| 4,189,261 | 2/1980 | Kelley et al.. |
| 4,325,660 | 4/1982 | Jones. |
| 4,661,026 | 4/1987 | Carlier. |
| 4,715,750 | 12/1987 | Podoll et al.. |
| 4,971,481 | 11/1990 | Foreman. |
| 4,984,939 | 1/1991 | Foreman. |
| 5,299,891 | 4/1994 | Grosswiller et al. .................. 406/112 |

FOREIGN PATENT DOCUMENTS

| 6412515 | 10/1964 | Niger. |
| 2134475 | 8/1984 | United Kingdom. |

Primary Examiner—Gary C. Hoge
Attorney, Agent, or Firm—Wood, Herron & Evans

[57] ABSTRACT

A pneumatic transmission system has a customer terminal, a teller terminal and a transmission tube connecting the terminals. A pair of blowers are disposed in the transmission tube. Each terminal has a slide gate which is operable to close the transmission tube, and a catch disposed below the gate which is operable to catch the pneumatic carrier. The carrier is transmitted from one terminal to the other terminal by opening the gate of the one terminal, closing the other gate of the other terminal, and energizing the blower remote from the one terminal, thereby creating a vacuum between the one blower and the carrier. The one blower is de-energized after the carrier has passed the one blower, and the carrier rides down on a cushion of air, coming to rest on the gate of the other terminal. The gate of the other terminal is then opened and the carrier drops downwardly onto the catch of the terminal. A controller and timer facilitate sequencing of the slide gates and blowers.

13 Claims, 3 Drawing Sheets

PNEUMATIC TRANSMISSION SYSTEM

This is a continuation of application Ser. No. 07/914,885 filed Jul. 16, 1992, U.S. Pat. No. 5,304,017.

FIELD OF THE INVENTION

This invention relates to pneumatic transmission systems, and more particularly to relatively simple and inexpensive pneumatic transmission systems which do not include sophisticated sensors and the like for sensing the location of a carrier's position within the transmission tube.

BACKGROUND OF THE INVENTION

Pneumatic transmission systems currently in use include a customer terminal, a teller terminal, a length of pneumatic transmission tube interconnecting the customer and teller terminals, and one or more blowers adapted to either supply a charge of air to or draw a vacuum from the pneumatic transmission tube. Often the pneumatic transmission system will incorporate some type of sophisticated carrier sensing device, which carrier sensing device tends to increase the complexity of the pneumatic transmission system, as well as the cost associated therewith. The sensing device is normally utilized incorporated into the pneumatic transmission system in order to monitor the position of the carrier and hence the need to energize the blowers associated with travel of the carrier through the transmission system.

One such pneumatic transmission system incorporating a complex and sophisticated carrier sensing device is disclosed in U.S. Pat. No. 4,971,481 to Foreman. Foreman discloses a terminal 10 having sensing means which comprise a piston 30 and air cylinder 36 which is operable to sense a pressure change in the shut off aperture 20 caused by movement of the carrier 22 past the shut off aperture and which activates a switch means 46 to terminate the stream of air from the pneumatic source 11a or 11b. The patent further discloses the use of the pressure monitor in conjunction with a catch for catching a carrier after it impacts on a stop and settles down on the catch.

A criticism of such complex carrier sensing devices is their relative complexity, which increases the overall cost of the pneumatic transmission system, and the detrimental effect on the overall reliability of the transmission system due to the reliability of the sensor device.

Another characteristic which is common amongst current pneumatic transmission systems is the custom nature of each teller terminal and customer terminal within a transmission system. More specifically, in current pneumatic transmission systems the customer terminal is of a custom construction having features and structure designed solely for the customer location. Similarly, the teller terminal will have features and structure specifically adapted for the teller location of the system. It will be appreciated that such custom construction of terminals for each location, namely customer and teller, greatly increases the costs associated with manufacturing a pneumatic transmission system, and additionally tends to decrease the reliability of same.

One such pneumatic transmission system which incorporates customized customer and teller terminals for use in commercial transactions is disclosed in U.S. Pat. No. 4,715,750 to Podoll et al. Podoll discloses a teller terminal T and a customer terminal C which include, respectively, relatively complex slide drawer mechanisms and pivoting drawer mechanisms.

It has therefore been an objective of the present invention to provide a relatively simple and inexpensive pneumatic transmission system which does not incorporate any of the aforementioned complex and expensive carrier sensor devices.

It has been another objective of the present invention to provide a simple and inexpensive universal terminal for a pneumatic transmission system, which terminal can be interchangeably used at either the customer terminal side or the teller terminal side of the system.

SUMMARY OF THE INVENTION

In accordance with the stated objectives, a pneumatic transmission system is provided which comprises a customer terminal, a teller terminal and a pneumatic transmission tube connecting the customer and teller terminals. The tube has two vertical sections, each of which extends upwardly from one of the customer and teller terminals, and a horizontal section connecting the two vertical sections. There is included a pair of blowers, one of which is disposed in the pneumatic transmission tube at each point where the tube transitions generally from horizontal to vertical.

Each of the customer and teller terminals has a gate for selectively opening and closing the transmission tube, and a catch disposed below the gate for catching a pneumatic carrier. The carrier is transmitted from one of the terminals to the other of the terminals by opening the gate of the one terminal, closing the gate of the other terminal, and energizing the blower remote from the one terminal, thereby creating a vacuum between the one blower and the carrier. After the carrier has passed the one blower, the one blower is deenergized. The carrier is decelerated on a cushion of air, coming to rest on the gate of the other terminal. The gate of the other terminal is then opened, and the carrier drops downwardly onto the catch of the other terminal.

The catch positions the carrier such that the upper end of the carrier is disposed within a lower end of the pneumatic transmission tube beneath the gate. Therefore, when the gate is open, a pneumatic seal is effected between carrier and tube such that when a vacuum is pulled on the tube, the carrier travels upwardly and toward the other terminal.

The pneumatic transmission system of the present invention further includes a timer connected to the blowers for controlling the length of duration during which the blowers are energized based on the average time of travel from one terminal to the other terminal, and a controller connected to the blowers and the terminals for controlling the sequence of operation of the blowers and slide gates.

The catch of each terminal of the pneumatic transmission system of the present invention comprises a presentation tray depending from the terminal and a combined stop and control panel affixed to the lower end of the presentation tray. Preferably the presentation tray is oriented approximately 30 degrees with respect to the vertical.

The gate of each terminal comprises a plate which slides into and out of the transmission tube. The plate includes a slot therein which is oriented generally transversely to the sliding direction of the plate. The slot captures the end of a pivotable driver arm. When the driver arm is pivoted in one direction, the captured end of the driver arm translates along the slot as the captured end simultaneously translates the plate out of the transmission tube. When the driver arm is pivoted in the other direction, the captured end of the driver arm translates along the slot as the captured end simultaneously translates the plate into the transmission tube.

The pneumatic transmission system of the present invention is completely free of the presence of carrier sensing devices which are normally employed in more expensive, complex and less reliable pneumatic systems.

One advantage of the present invention is that a relatively simple and inexpensive pneumatic transmission system is provided which does not require the relatively costly and complex carrier sensor devices of traditional pneumatic transmission systems.

Another advantage of the present invention is that a universal customer/teller terminal is provided which can be utilized at both ends of the pneumatic transmission system, further reducing the costs associated with the transmission system.

These and other objects and advantages of the present invention will become more readily apparent during the following detailed description taken in conjunction with the drawings herein, which:

DESCRIPTION OF PREFERRED EMBODIMENTS

Figure 1:
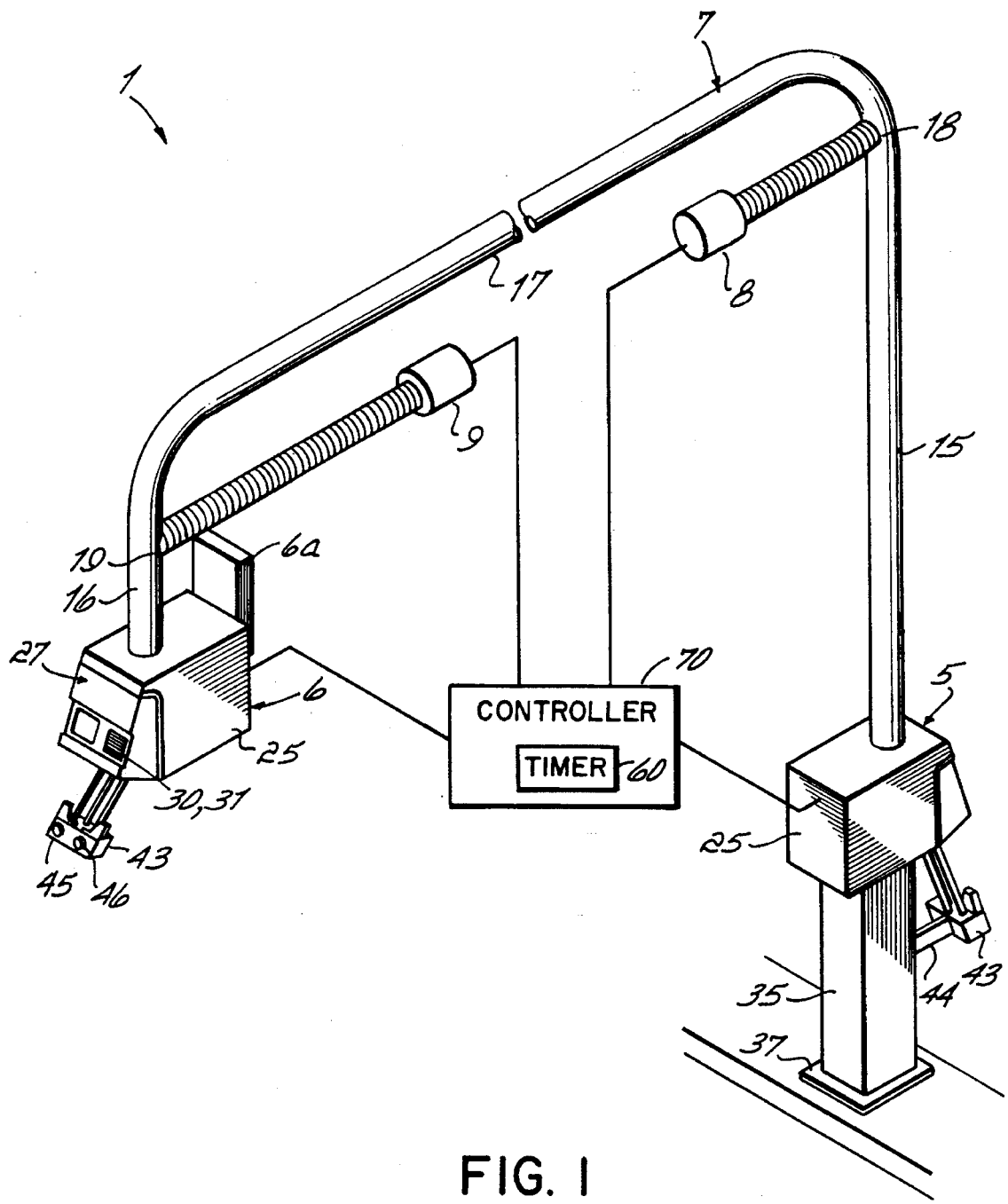
FIG. 1 is a perspective view of the pneumatic transmission system of the present invention.

With reference first to FIG. 1, there is illustrated the pneumatic transmission system of the present invention. The system 1 includes, generally, a customer terminal 5, a teller terminal 6, a length of pneumatic transmission tubing 7 connecting the customer terminal 5 and teller terminal 6, and a pair of blowers 8 and 9 located in the tube 7 for energizing the system in order to transmit a carrier therethrough. The system 1 is completely free of the presence of carrier sensing devices which are normally employed in more expensive, complex and less reliable pneumatic systems to monitor the position of the carrier within the tubing and/or terminals.

More particularly, the pneumatic transmission tube 7 includes a vertical section 15 extending upwardly from the customer terminal 5 and a vertical section 16 extending upwardly from the teller terminal 6. The transmission tube 7 further includes a horizontal section 17 interconnecting the vertical sections 15 and 16. Blower 8 is located near where the vertical section 15 transitions into the horizontal section 17, as illustrated at 18. Blower 9 is located near where the vertical section 16 transitions into horizontal section 17, as illustrated at 19.

Figure 2:
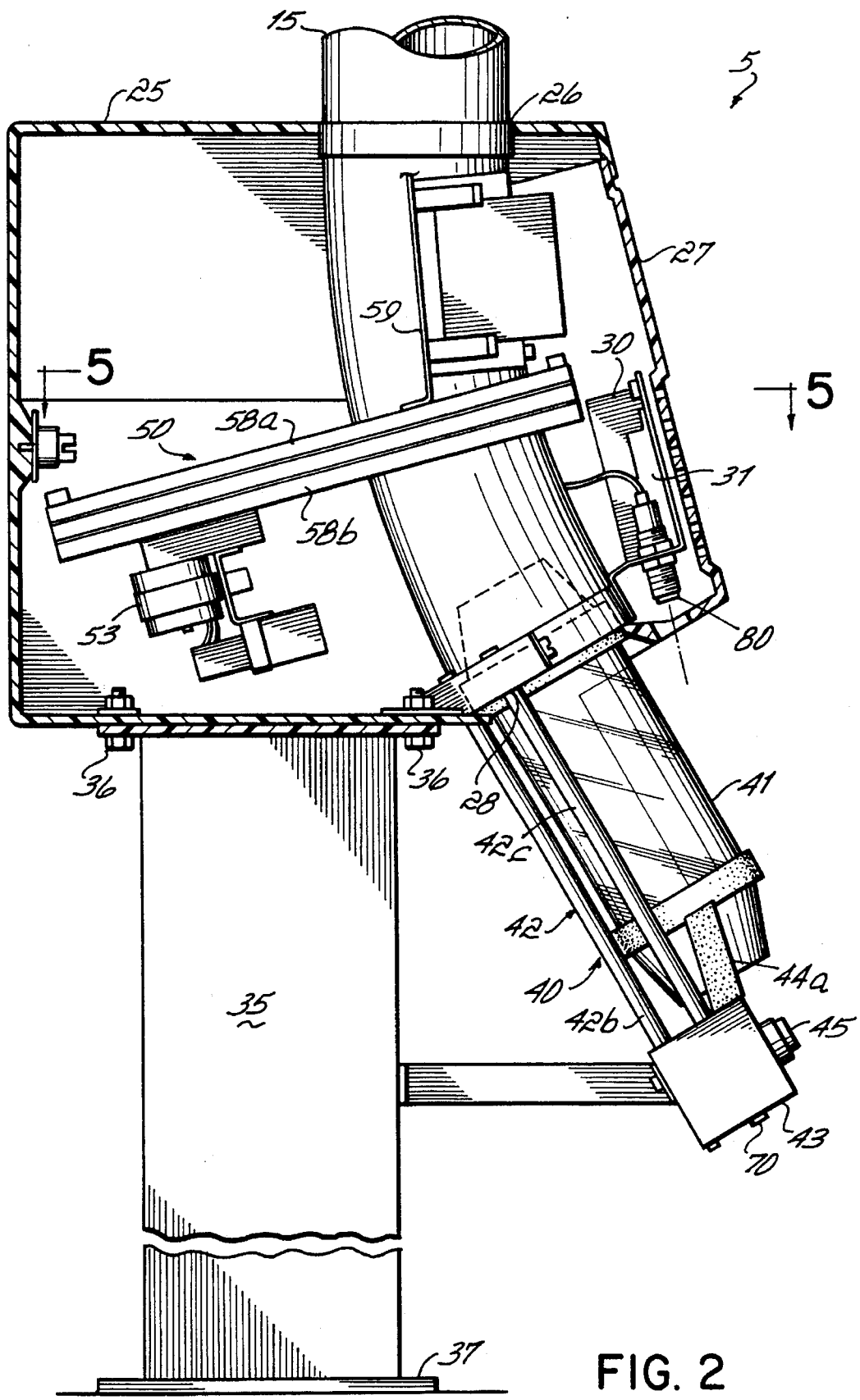
FIG. 2 is a side view of the customer terminal of the transmission system of FIG. 1 in partial cross-section.

With reference to FIG. 2, there is illustrated in side view, partially broken away, the customer terminal 5 of the present invention. As will be appreciated from FIG. 1, it will be seen that the customer terminal 5 and teller terminal 6 are substantially identical in construction, the only difference being that the customer terminal 5 is pedestal mounted and the teller terminal 6 is, for example, wall mounted as by bracket 6a, or counter mounted within the banking institution. Therefore, the terminal included in the present invention is a universal type terminal, and can be used at either the customer or teller location. Such a universal design greatly decreases the cost associated with the pneumatic transmission system of the present invention, as a single terminal can be adapted for all locations.

Referring now back to FIG. 2, the customer terminal 5 includes a rear cabinet 25 into which the vertical section 15 of the tube 7 enters at 26. A front cover 27 is attached to the front of the rear cabinet 25. As can be seen from the Figure, the vertical section 15 continues downwardly through the height of rear cabinet 25 and then terminates at a lower end 28. The section of the tube 15 between 26 and 28 curves slightly so that the center line axis of the lower end 28 forms an angle of approximately 30 degrees with respect to the vertical. The front panel 27 includes provision for communicating with a teller via a microphone 30 and speaker 31.

The customer terminal 5 as previously described is mounted atop a pedestal 35 with suitable fasteners 36, the pedestal 35 including a base 37.

A catch assembly 40 depends from the lower end 28 of the tube 15 for supporting a carrier 41 therein. The assembly 40 includes a presentation tray 42 comprising 3 rods 42a, 42b and 42c for supporting the carrier 41. Connected to the lower ends of the rods 42a, 42b and 42c is a combined stop and communication/control panel 43. A beam 44 supports the stop and control panel 43 and connects same to pedestal 35. Left and right stop blocks 44a and 44b are mounted on either side of the stop/control panel 43 and serve to catch the carrier 41 as it is dropped into the presentation tray 42. Call and send buttons 45 and 46 are provided on the stop/control panel 43 for communicating with the teller and dispatching the carrier 41. A rocker switch 70 located on the bottom of stop/panel 43 turns the entire terminal on and off. A photo-interrupter 80 prevents slide gate assembly 50 from opening if a user's hand is adjacent the presentation tray 42.

Figure 3:
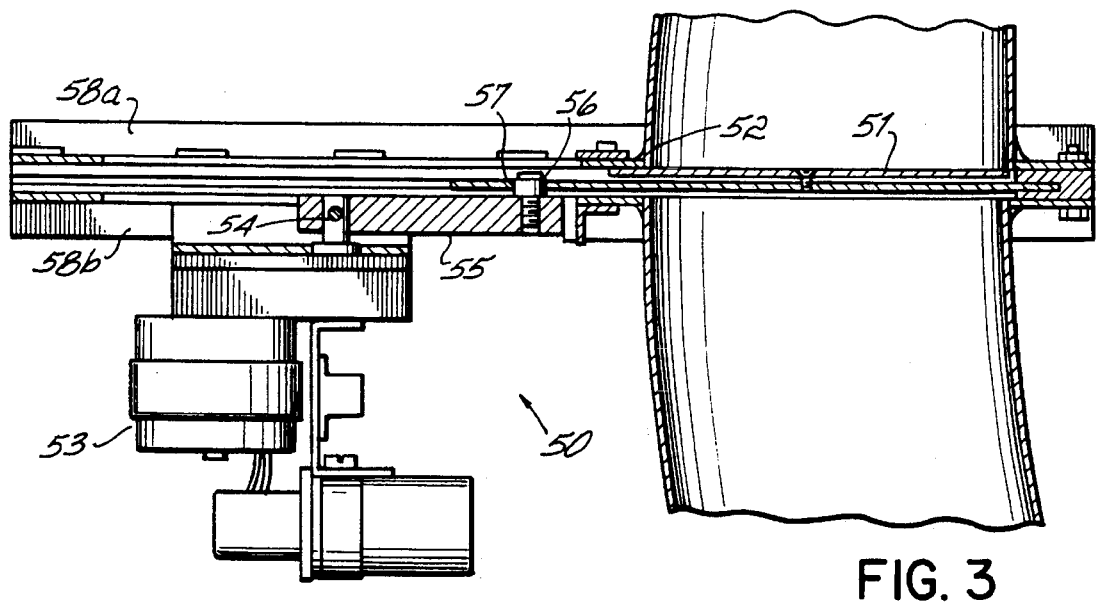
FIG. 3 is an enlarged side view of the terminal of FIG. 2 illustrating the slide gate closed.
Figure 4:
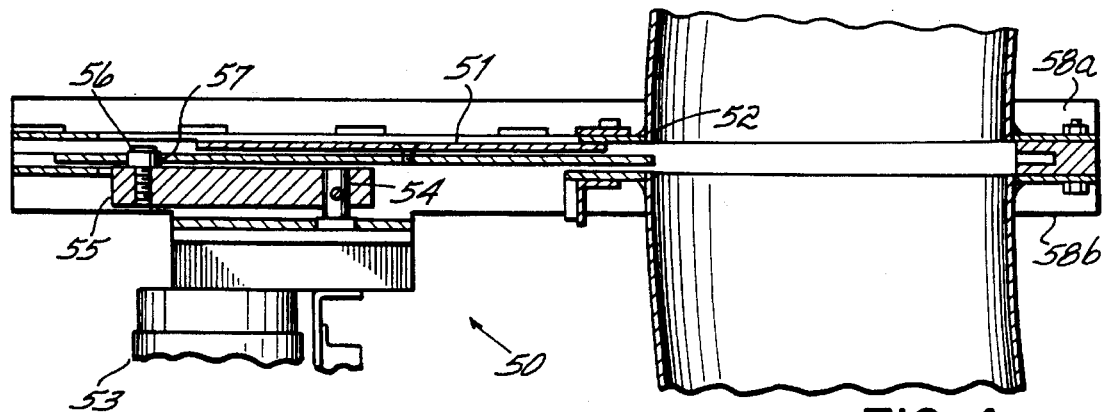
FIG. 4 is a view similar to FIG. 3 illustrating the slide gate open.
Figure 5:
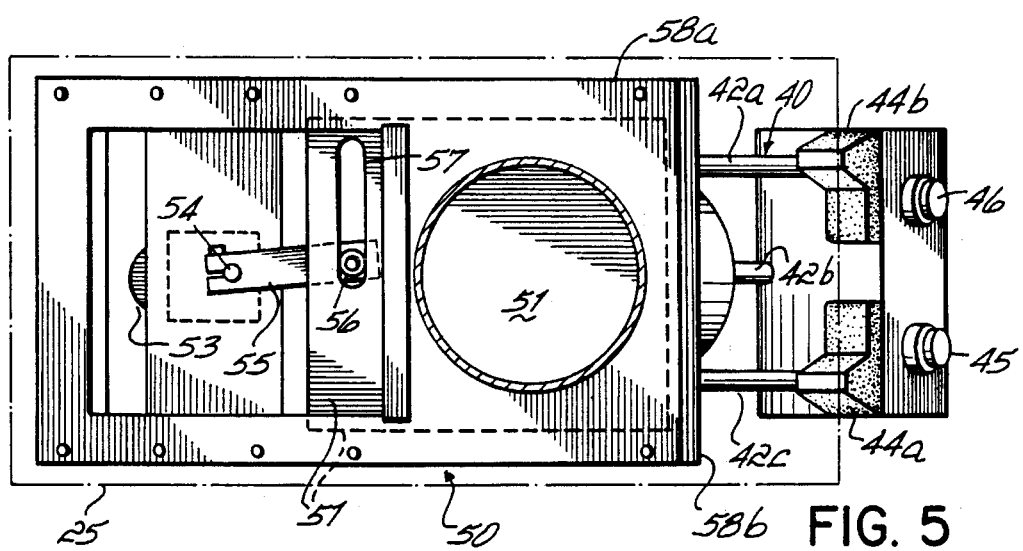
FIG. 5 is a view taken along lines 5—5 of FIG. 2, further illustrating the slide gate and carrier catch of the universal terminal of the present invention.

Referring now to FIG. 2, and in particular to FIGS. 3–5, there is illustrated the slide gate assembly 50 of the present invention. The gate assembly 50 includes a plate 51 which slides fore and aft within the cabinet 25 of the terminal and which, in doing so, slides into and out of the path of the transmission tube at 52. In order to actuate the plate 51, an electric motor 53 includes a driven or output shaft 54 to which is secured a driver arm 55. The driver arm 55 includes a bearing 56 secured to its radially outermost end, which rides in a slot 57 located in the plate 51. This slot 57 is oriented generally transversely with respect to the direction of the travel of the plate 51.

As can be seen from FIG. 5, when the driver arm 55 is rotated counterclockwise, the bearing 56 translates outwardly, minimizing frictional forces, while simultaneously translating the plate 51 out of the path of the tube 52. When the driver arm 55 is rotated clockwise, the bearing 56 translates inwardly along the slot 57 while simultaneously translating the plate 51 into the path of the transmission tube at 52. The entire slide gate assembly 50 operates within a pair of opposed frames 58a and 58b secured to the cabinet 25 as by bracket 59.

Describing now the operation of the pneumatic transmission system of the present invention, carrier transport from terminal to terminal is accomplished by introducing negative pressure downstream of the carrier at the point associated with the destination terminal where the horizontal travel of the carrier transitions from horizontal to vertical (downward). With the originating terminal vented and the destination terminal sealed, the carrier will be propelled by air pressure until reaching a point in the bend where the pressure (negative) is introduced. At that point, gravity and momentum take over and allow the carrier to continue its vertical (downward) travel to the destination terminal where it is decelerated and cushioned by the trapped air column.

More particularly, to transmit the carrier from teller terminal 6 to customer terminal 5, the teller terminal 6 slide gate assembly 50 is opened and the customer terminal 5 slide gate assembly 50 is closed. Blower 8 is energized to pull a vacuum from the teller terminal 6 to the customer terminal 5. Since the carrier catch assembly 40 pneumatically sealably positions the carrier 41 with its upward end disposed within the lower end 28 of the transmission tube 15, the carrier accelerates upwardly. Upon passing the blower 8, the carrier is decelerated via the air column trapped above the customer terminal slide gate assembly 50. A timer 60 is correlated to the average time it takes the carrier to travel from the catch assembly 40 of the teller terminal 6 to the slide gate assembly 50 of the customer terminal 5 (as well as from catch assembly 40 of customer terminal 6 to slide gate assembly 50 of teller terminal 6 when transmitting the carrier in the other direction). After the carrier 41 comes to rest on plate 51 of the customer terminal slide gate assembly 50, the blower 8 is deactivated by the aforementioned timer 60. Slide gate assembly 50 of customer terminal 5 is then opened after a timer actuated delay to allow the carrier 41 to slide into the presentation tray 42 and drop onto the stop/control panel 43. The slide gate assembly 50 of teller terminal 6 is simultaneously closed in preparation for sending the carrier 41 from customer terminal 5 to teller terminal 6.

The carrier is transmitted from the catch assembly 40 of customer terminal 5 to the teller terminal 6 slide gate assembly 50 in exactly the same manner, except blower 9 is utilized, the customer terminal 5 slide gate assembly 50 is opened, and the teller terminal 6 slide gate assembly 50 is closed.

To facilitate energizing and de-energizing the blowers 8 and 9 and opening and closing the slide gates 50 at the desired times and in the desired sequence, a suitable controller 70 such as an appropriately programmed microprocessor or sequence controller is provided. Since controllers of the type noted are well known to those skilled in the art, further discussion is unnecessary.

As can be seen from the foregoing description, the pneumatic transmission system of the present invention provides a relatively simple, low cost pneumatic transmission system for use in banking transactions and like, which system has fewer components and thus reduced complexity and increased reliability over many other types of pneumatic transmission systems currently in existence. Furthermore, the present invention provides a universal customer/teller terminal which can be employed at either customer or teller location, thereby further reducing the complexity and cost of such a system by avoiding the need for custom designed customer and terminal terminals. The only major difference between the customer and teller terminals is that the call button of the customer is replaced with a retrieve button at the teller location thereby allowing the teller to both send and retrieve the carrier.

Those skilled in the art will readily recognize numerous adaptations and modifications which can be made to the present invention and which will result in an improved pneumatic transmission system, yet all of which will fall within the spirit and scope of the present invention as defined by the appended claims and their equivalents. Accordingly, it is intended that the present invention be limited only by the following claims and their equivalents.

What is claimed is:

1. A universal customer/teller pneumatic transmission terminal for sending and receiving a pneumatic carrier propelled by a blower in combination with an actuating means, said combination comprising:

a cabinet;

a pneumatic transmission tube extending completely through said cabinet and terminating in a continuously open-to-atmosphere insertion/exit opening;

gate means disposed in said cabinet and spaced from said tube insertion/exit opening for selectively opening and closing said pneumatic transmission tube;

catch means disposed below said cabinet for catching the pneumatic carrier; and said actuating means being for actuating the blower and said gate means independently of the location of the carrier in said pneumatic transmission tube.

2. A universal customer/teller pneumatic transmission terminal for sending and receiving a pneumatic carrier propelled by a blower in combination with a controller, said combination comprising:

a cabinet;

a pneumatic transmission tube extending completely through said cabinet and terminating in a continuously open-to-atmosphere insertion/exit opening;

a gate disposed in said cabinet and spaced from said tube insertion/exit opening and operable to selectively open and close said pneumatic transmission tube;

a catch disposed below said cabinet for catching the carrier; and said controller being operable to actuate the blower and said gate independently of the location of the carrier in said pneumatic transmission tube.

3. A universal customer/teller pneumatic transmission terminal for sending and receiving a pneumatic carrier propelled by a blower in combination with an actuating means, said combination comprising:

a cabinet;

a pneumatic transmission tube extending completely through said cabinet and terminating in a continuously open-to-atmosphere insertion/exit opening;

a gate disposed in said cabinet and spaced from said tube insertion/exit opening and operable to selectively open and close said pneumatic transmission tube;

a catch disposed below said cabinet for catching the carrier; and said actuating means being for actuating the blower and said gate independently of the location of the carrier in said pneumatic transmission tube.

4. A universal customer/teller pneumatic transmission terminal for sending and receiving a pneumatic carrier propelled by a blower in combination with a controller, said combination comprising:

a pneumatic transmission tube terminating in a continuously open to atmosphere carrier insertion/exit opening, said insertion/exit opening having a peripheral portion for sealingly embracing a leading end of an inserted carrier;

a gate in said tube and spaced from said insertion/exit opening for selectively opening and closing said tube; and said controller being for activating the blower and said gate independently of the location of the carrier in said tube.

5. The combination of claim 4 further comprising a cabinet, said tube extending through said cabinet.

6. The combination of claim 4 further comprising a catch spaced exteriorly relative to said tube insertion/exit opening.

7. The combination of claim 4 wherein said controller operates the blower and said gate for predetermined time intervals.

8. The combination of claim 4 wherein the carrier comes to rest on said gate in the closed position.

9. A pneumatic transmission system comprising:

a customer terminal;

a teller terminal;

a pneumatic transmission tube connecting said terminals, said tube terminating in a continuously open-to-atmosphere carrier insertion/exit opening at each said terminal, each said opening having a peripheral portion for sealingly embracing a leading end of an inserted carrier;

a pair of blowers disposed in said tube each of which is operably associated with one of said terminals;

a gate in said tube and spaced from said insertion/exit opening at each said terminal for selectively opening and closing said tube; and a controller for activating said blowers and said gates independently of the location of the carrier in said tube.

10. The system of claim 9 wherein each said terminal further comprises a cabinet, said tube extending through said cabinet.

11. The system of claim 9 wherein each said terminal further comprises a catch spaced exteriorly relative to said tube insertion/exit opening.

12. The system of claim 9 wherein said controller operates the blower and said gate for predetermined time intervals.

13. The system of claim 9 wherein the carrier comes to rest on said gate in the closed position.

* * * * *

UNITED STATES PATENT AND TRADEMARK OFFICE
CERTIFICATE OF CORRECTION

PATENT NO.   : 5,564,868
DATED        : October 15, 1996
INVENTOR(S)  : Vagel, Victor J.; O'Connor, Robert M.; Smith, Robert D. Jr.

It is certified that error appears in the above-indentified patent and that said Letters Patent is hereby corrected as shown below:

Column 6, line 57, Claim 4, "open to atmosphere" should read --open-to-atmosphere-- with hypenation between words.

Signed and Sealed this

Fifth Day of August, 1997

*Attest:*

BRUCE LEHMAN

*Attesting Officer*   *Commissioner of Patents and Trademarks*